(12) United States Patent
Gonzalez et al.

(10) Patent No.: US 7,665,000 B2
(45) Date of Patent: Feb. 16, 2010

(54) MEETING POINT THREAD CHARACTERIZATION

(75) Inventors: Antonio Gonzalez, Barcelona (ES); Qiong Cai, Barcelona (ES); Jose Gonzalez, Terrassa (ES); Pedro Chaparro, La-Garriga Barcelona (ES); Grigorios Magklis, Barcelona (ES); Ryan Rakvic, Annapolis, MD (US)

(73) Assignee: Intel Corporation, Santa Clara, CA (US)

( * ) Notice: Subject to any disclaimer, the term of this patent is extended or adjusted under 35 U.S.C. 154(b) by 511 days.

(21) Appl. No.: 11/714,938

(22) Filed: Mar. 7, 2007

(65) Prior Publication Data

US 2008/0222466 A1 Sep. 11, 2008

(51) Int. Cl.
*G01R 31/28* (2006.01)

(52) U.S. Cl. .................. 714/724; 709/107
(58) Field of Classification Search .............. 718/108, 718/107; 712/22; 714/724; 709/107
See application file for complete search history.

(56) References Cited

U.S. PATENT DOCUMENTS

| | | | |
|---|---|---|---|
| 6,389,449 B1 * | 5/2002 | Nemirovsky et al. | 718/108 |
| 6,789,100 B2 * | 9/2004 | Nemirovsky et al. | 718/107 |
| 7,020,879 B1 * | 3/2006 | Nemirovsky et al. | 718/107 |
| 7,467,385 B2 * | 12/2008 | Nemirovsky et al. | 718/107 |
| 7,584,342 B1 * | 9/2009 | Nordquist et al. | 712/22 |

* cited by examiner

*Primary Examiner*—David Ton
(74) *Attorney, Agent, or Firm*—Trop, Pruner & Hu, P.C.

(57) ABSTRACT

An apparatus associated with identifying a critical thread based on information gathered during meeting point processing is provided. One embodiment of the apparatus may include logic to selectively update meeting point counts for threads upon determining that they have arrived at a meeting point. The embodiment may also include logic to periodically identify which thread in a set of threads is a critical thread. The critical thread may be the slowest thread and criticality may be determined by examining meeting point counts. The embodiment may also include logic to selectively manipulate a configurable attribute of the critical thread and/or core upon which the critical thread will run.

15 Claims, 4 Drawing Sheets

MEETING POINT THREAD CHARACTERIZATION

TECHNICAL FIELD

Embodiments of the invention relate to the field of microprocessors and computer systems. More particularly, at least one embodiment of the invention relates to an apparatus for detecting critical threads in multithreading environments through the use of meeting points. One embodiment manipulates energy consumption for imbalanced parallel applications based on the meeting point based critical thread identification.

BACKGROUND

In computer systems, a processor may have one or more cores. A core may be tasked with running one or more threads. Thus, a multi-core processor may be tasked with running a large number of threads. These threads may run at different speeds. When the threads are related to each other, as they are when they are associated with a parallel application, imbalances in thread execution speed and thus thread completion time may lead to power inefficiencies. These issues may exist in single-core systems and/or in multi-core systems (e.g., simultaneous multithreading system (SMT), chip level multithreading system (CMP)) running parallel applications.

Consider the following situation. If a core is running multiple threads, each of which is handling a portion of a parallel workload, and one of the threads is running slower than the other thread(s), then that thread will likely complete its assigned portion of a parallel workload after the other(s). The other thread(s) may waste energy while waiting for the slower thread to complete. If n (n being an integer greater than one) cores exist, but m (m being an integer less than n) cores are idle because they are waiting for another core(s) to complete, power is being wasted by the waiting cores. In some systems, threads that complete their work ahead of other threads may be put to sleep and thus may not consume power. However, putting a core to sleep and then waking up the core consumes time and energy and introduces computing complexity. In a tera-scale environment, tens or even hundreds of cores in a processor may run highly parallel workloads. In this environment, tens or even hundreds of cores may be waiting for a slow core to complete, multiplying power inefficiency caused by workload imbalances between cores.

BRIEF DESCRIPTION OF THE DRAWINGS

The accompanying drawings, which are incorporated in and constitute a part of the specification, illustrate various apparatus embodiments and other embodiments of various aspects of the invention. It will be appreciated that the illustrated element boundaries (e.g., boxes, groups of boxes, or other shapes) in the figures represent one example of the boundaries.

DETAILED DESCRIPTION

One embodiment of the invention provides an apparatus for establishing and using meeting points to detect imbalances between threads co-operating on a parallel workload. Detecting imbalances may facilitate identifying a critical thread (e.g., slowest thread) that is likely to complete its task last amongst its peers. Data collected when threads execute an instruction located at a meeting point can be used to determine relative execution rates for threads and, based on the relative execution rates, to dynamically reconfigure thread and/or core parameters.

In one embodiment, the priority of a slower thread may be increased and/or the priority of a faster thread may be decreased to balance execution times. The priority may concern, for example, issue bandwidth. Issue bandwidth is the peak rate at which instructions can be sent from an instruction queue to functional units. In another embodiment, the operating frequency and/or voltage for a core may be manipulated based on a predicted core completion time and its relation to other predicted core completion times. In yet another embodiment, a core may be gate clocked when a critical thread running on that core becomes idle upon, for example, experiencing a cache miss. Due to the quadratic effect that voltage has on power, energy efficiency may be improved by running the faster thread at a lower frequency and voltage to make it arrive at the meeting point at or near the same time as the slower thread. This energy efficiency may exceed that of simply having the core running the faster thread go to sleep when the faster thread completes early.

Manipulating thread priority, core frequency and/or voltage, and gate clocking based on critical thread identity and/or behavior as determined from data associated with meeting point processing may produce an architecture with reduced energy wastage due to imbalanced threads and/or cores.

Figure 1:
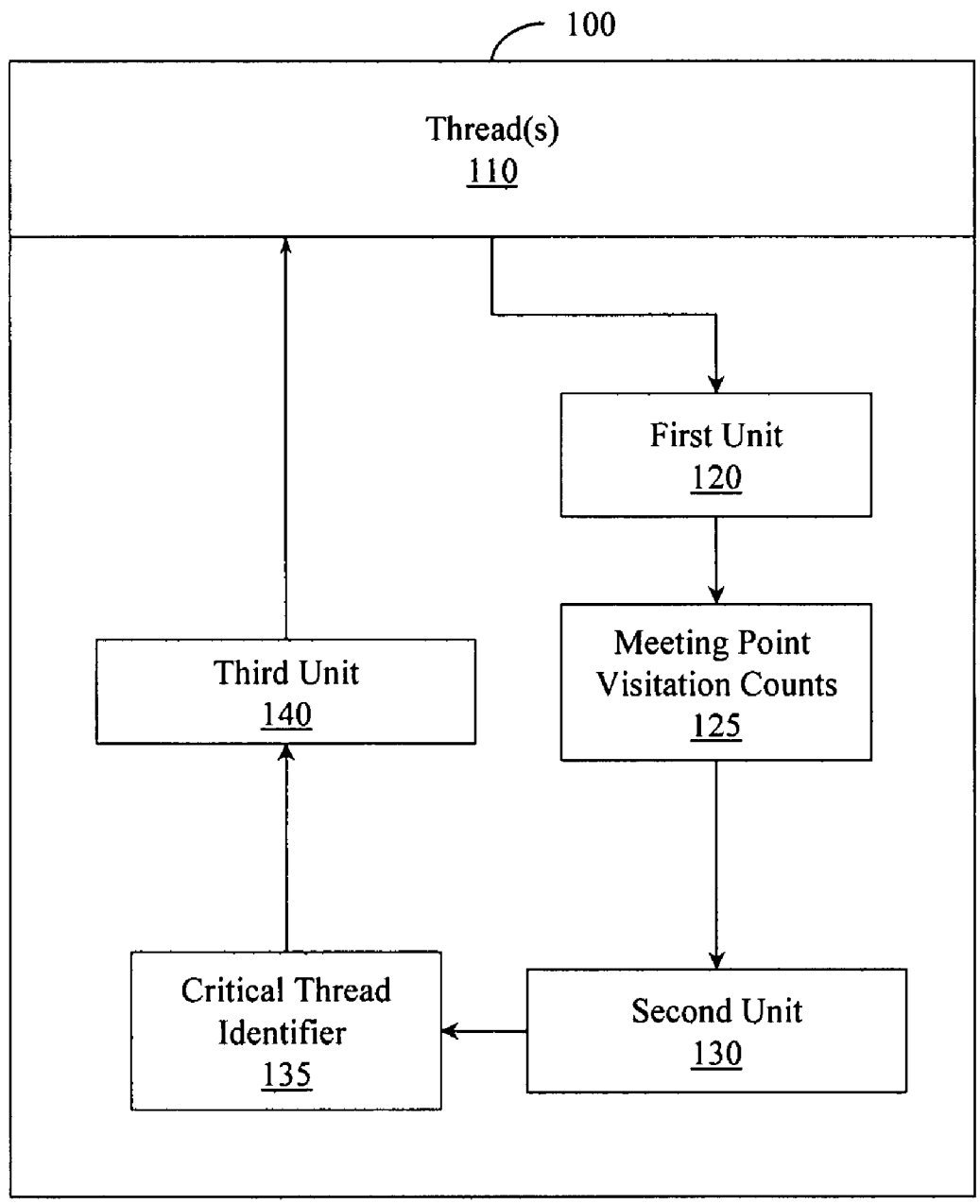
FIG. 1 is a block diagram illustrating an organization of processing logic in which at least some aspects of at least one embodiment of the invention may be performed.

FIG. 1 illustrates a multithreading core 100 on which a set of threads 110 can run. Core 100 may run one thread, may run two threads, may run more than two threads, and so on. The larger set of threads on core 100 and other co-operating cores is tasked with executing a parallel workload. Core 100 includes an apparatus to characterize threads based on data related to members of the set of threads 110 executing instructions located at meeting points. The characterizing may include identifying a critical thread, which is defined as the thread amongst its peers most likely to reach a synchronization point last.

Thus, FIG. 1 illustrates a first unit 120 that will selectively update a meeting point count for a thread when first unit 120 determines that the thread has arrived at a meeting point. A set 125 of meeting point counts may be maintained and may include one count per thread. A meeting point may be, for example, an address of an instruction that a member of the set of threads is to execute. A meeting point may be located, for example, at the back edge of a parallelized loop. In one example, the first unit 120 detects the arrival of a thread at a meeting point by comparing an instruction pointer value to a meeting point address. The count may be maintained, for example, in a register, in memory, and so on.

FIG. 1 also illustrates a second unit 130 that periodically will identify a critical thread in the set of threads 110. The critical thread can be identified from the thread meeting point counts 125. A critical thread identifier 135 may be produced by the second unit 130. For example, the thread having the lowest meeting point count after a selected period of time can be identified in identifier 135 as the critical (e.g., slowest) thread. In one embodiment, the period of time for which meeting point counts 125 are compared to identify a critical thread is a configurable value. In different embodiments the period of time may be user configurable based on a user input and/or automatically configurable based on an automatic analysis of a thread mix.

Consider an automobile race run on a loop track. Each time a car passes the start/finish line a count is increased for that car. After a period of time (e.g., 30 minutes), which car is running last can be determined by examining the lap counts. The first unit 120 and the meeting point counts 125 produce an analogous situation. Consider now an automobile race run on three identical loop tracks in three different locations. Each time a car passes the start/finish line on its track a count is increased for that car. Information (e.g., lap counts) from the three tracks could be shared and thus, in effect, a race could be carried out between cars on different tracks. Sharing the meeting point counts 125 between cores achieves an analogous result and facilitates identifying a critical thread even between multiple cores.

FIG. 1 also illustrates a third unit 140 that will selectively manipulate a configurable attribute of the critical thread and/or a core containing a critical thread upon which the critical thread is to run. The configurable attribute may be, for example, a priority (e.g., issue priority), an operating frequency, and so on.

Figure 2:
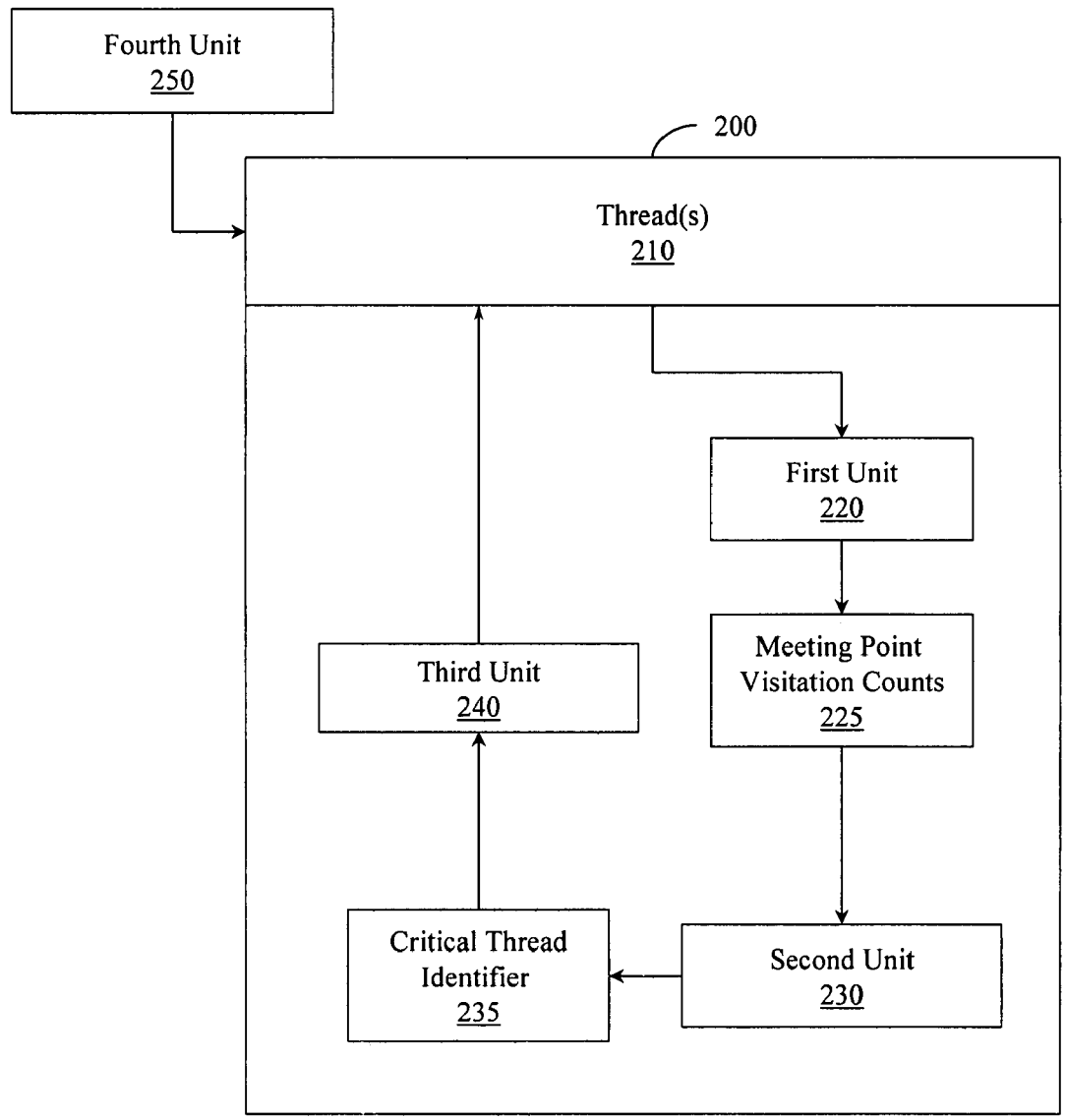
FIG. 2 is a block diagram illustrating an organization of processing logic in which at least some aspects of at least one embodiment of the invention may be performed.

FIG. 2 illustrates a multithreading core 200 having some elements similar to those described in connection with core 100 (FIG. 1). For example, core 200 includes a first unit 220 that updates meeting point counts 225 for members of a set of threads 210, which are used by a second unit 230 to produce a critical thread identifier 235. A third unit 240 then selectively takes actions for the thread identified in the critical thread identifier 235. However, FIG. 2 also illustrates a fourth unit 250.

Fourth unit 250 may establish meeting points. In one embodiment the fourth unit 250 may be a compiler that inserts an instruction into an executable. In another embodiment the fourth unit 250 may be a run-time analyzer implemented in hardware in core 200. In this embodiment, the fourth unit 250 may not insert an instruction into an executable but may compare an IP for an executing thread to an address identified as a meeting point.

Figure 3:
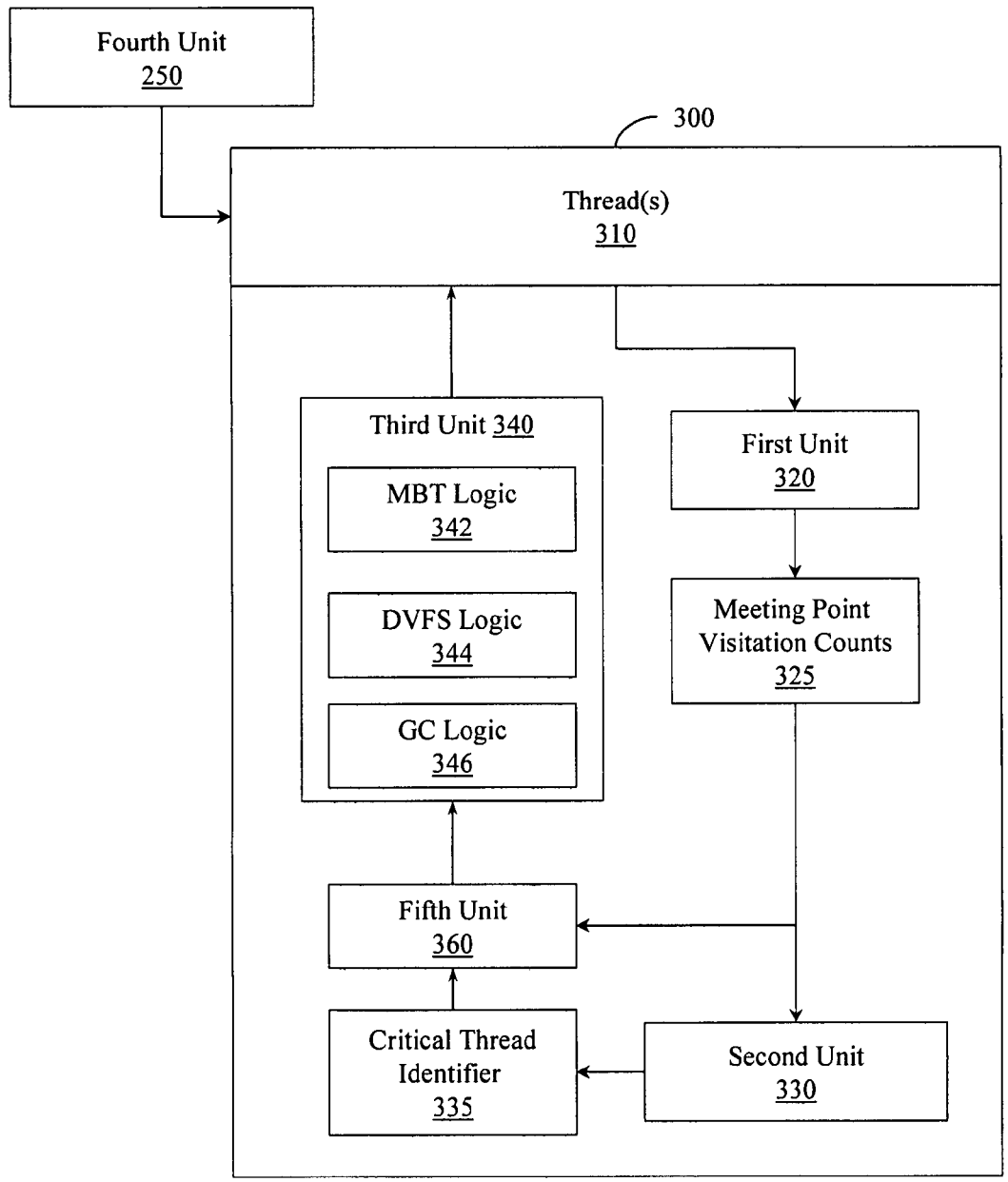
FIG. 3 is a block diagram illustrating an organization of processing logic in which at least some aspects of at least one embodiment of the invention may be performed.

FIG. 3 illustrates a multithreading core 300 having some elements similar to those described in connection with core 200 (FIG. 2). For example, core 300 includes a first unit 320 that updates meeting point counts 325 for members of a set of threads 310, which are used by a second unit 330 to produce a critical thread identifier 335. A third unit 340 then selectively takes actions for the thread identified in the critical thread identifier 335. However, FIG. 3 also illustrates a fifth unit 360 and further characterizes third unit 340.

Fifth unit 360 may determine an imbalance factor relating the critical thread to another member of the set of threads 310. In one embodiment, the imbalance factor may describe a difference between when the critical thread and when a non-critical thread in the set of threads 310 will complete. This predicted completion time may depend, for example, on a ratio between a meeting point count for a thread and a total number of loop iterations performed during the identification time period. In this embodiment, the configurable attribute upon which third unit 340 may operate is a priority of the critical thread. Thus, the third unit 340 may cause the priority of the critical thread relative to the priority of the non-critical thread to be increased and/or may cause the priority of the non-critical thread relative to the critical thread to be decreased. These increases or decreases may be based on processing a fastest thread identifier and an iteration difference counter that identifies the magnitude of the difference between the fastest thread the critical thread. Thus, in one embodiment, third unit 340 may include an MBT (multi-balancing thread) logic 342 that causes the priority increases or decreases by processing the fastest thread identifier and the iteration difference counter to produce a prioritization message that may be provided, for example, to a priority logic. In one embodiment, the priority may be the issue priority. In one embodiment, the degree to which the issue priority is manipulated may depend on the magnitude of the imbalance factor.

In another embodiment of core 300, the first unit 320 may provide a signal identifying the thread that arrived at the meeting point and the meeting point at which the thread arrived. This signal may be a message that is provided to other cores with which core 300 is cooperating to perform a parallel workload. In this embodiment, the fifth unit 360 may determine an imbalance factor relating the core containing a critical thread to a second core associated with a non-critical member of the set of threads. The imbalance factor will describe the difference in predicted completion times between the core containing a critical thread and the second core. The predicted completion time may depend, for example, on meeting point counts 325 and a total number of loop iterations during a period of time associated with periodically identifying a critical thread.

Establishing "meeting points", which function as pseudo-synchronization points, provides opportunities for example systems and methods to identify a core(s) that will complete before other cores and/or to identify a core(s) that will complete after other cores. Thus, establishing the meeting points provides opportunities to adjust frequency/voltage settings for the identified cores. In a parallel execution situation, when a core reaches a meeting point, it can be determined whether the core is running fast (e.g., early arriver) or running slow (e.g., late arriver). The (f,v) for the core can then be adjusted accordingly in an attempt to have cores working on the same parallel workload reach a synchronization point at closer points in time.

In this embodiment, which deals with multiple cores, the configurable attribute that third unit 340 may manipulate may be an operating frequency of a non-critical core(s). Determining whether a core is running fast or slow can including sending and receiving messages concerning arrival at a meeting point. For example, when a core arrives at a meeting point, a message can be broadcast to other cores identifying which meeting point has been reached and by which core. Additionally, messages previously provided, if any, can be examined to determine whether other cores have already reached the meeting point. Rather than examining previously received messages, data that has been updated in response to previously received messages (e.g., meeting point count) may be examined. With knowledge of how many cores are running and where the core stands in the mix of cores, frequency and voltage can be manipulated to different degrees.

The third unit 340 may, for example, cause a decrease in the operating frequency of the second core. Thus, third unit 340 may include a DVFS (dynamic voltage frequency scaling) logic 344 to track frequency histories, to predict new desired frequencies, and to provide control signals to change operating frequencies. An operating frequency may be decreased by DVFS logic 344 by, for example, providing a signal to a clock, providing a signal to a clock divider, providing a signal to a control logic, and so on. The signal may identify a desired frequency, a desired voltage, and so on. In one embodiment, the degree to which the operating frequency of the second core is decreased depends on the magnitude of the imbalance factor.

Consider a situation where it has been determined that a core operating at a first frequency/voltage setting (f1,v1) will arrive at a synchronization point before its co-operating peers. In this situation, the frequency/voltage setting can be changed to (f2,v2), f2<f1, v2<v1, so that the core will finish at a time closer to the finish time of its co-operating peers. At (f1,v1), the core would arrive at the synchronization point before the other cores having run at a voltage and frequency higher than necessary. For example, if a thread takes half of the time of the critical thread to reach a meeting point, it would be more energy-efficient to half the frequency and reduce the voltage accordingly so that the thread would arrive at the meeting point at or near the time of the critical thread. Recall the quadratic relationship between power and voltage. Thus, by reducing (f1,v1) to (f2,v2), the core will use less energy to get to the synchronization point, will not have to waste energy waiting once it gets there, and will even use less energy than if it arrived and went to sleep.

In another embodiment of core 300, third unit 340 may cause the core containing a critical thread to be selectively clock-gated upon determining that the critical thread has experienced a cache miss. In this embodiment, third unit 340 may include a GC (gate clock) logic 346 that detects cache misses for a critical thread and that provides a signal to a clock, to a divider, to a control logic, and so on.

In one embodiment, first unit 120, first unit 220, first unit 320, second unit 130, second unit 230, second unit 330, third unit 140, third unit 240, third unit 340 and/or fifth unit 360 may be "logics" as that term is defined herein.

Figure 4:
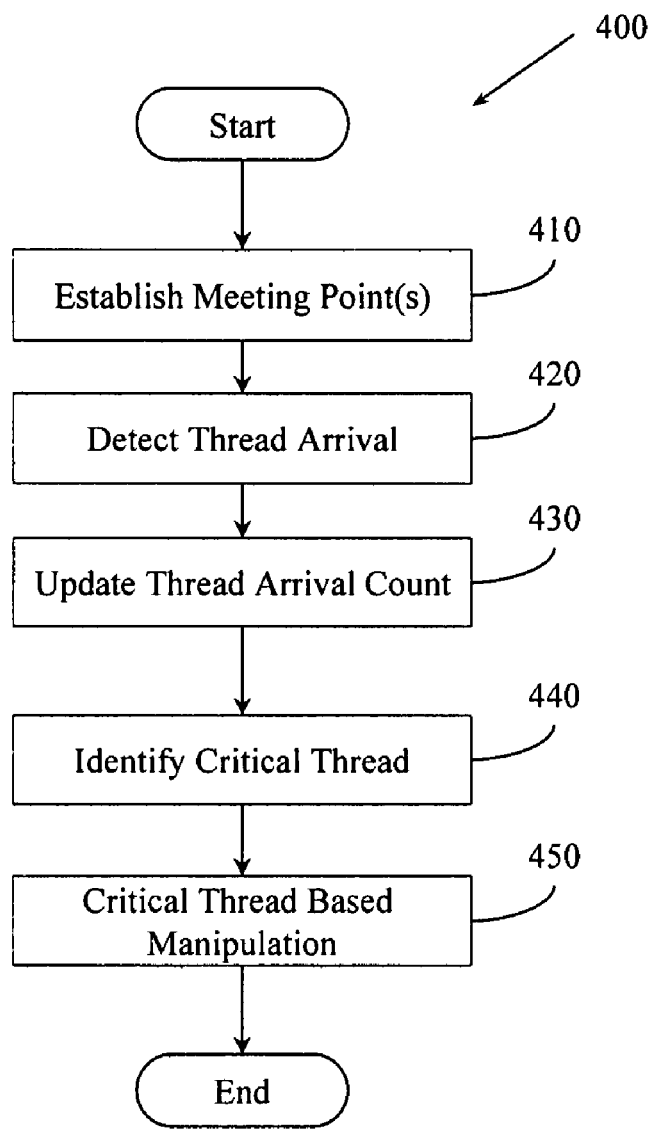
FIG. 4 is a block diagram illustrating a method that may perform at least some aspects of at least one embodiment of the invention.

FIG. 4 illustrates a method 400 for characterizing threads in a set of threads carrying out a parallel workload on a set of multithreading cores. Method 400 may include, at 410, establishing a meeting point at which a member of the set of threads may arrive. While a single meeting point is described, it is to be appreciated that more than one meeting point may be established.

Method 400 may also include, at 420, detecting that a member of the set of threads has reached a meeting point. This may include, for example, reaching a branch instruction inserted into an executable, determining that a thread IP matches a meeting point address, and so on.

Method 400 may also include, at 430, updating for the thread a thread arrival count that records how many times the thread has reached the meeting point. In one embodiment, a message describing the arrival at 420 and the updating at 430 may be provided to multithreading cores upon which members of the set of threads run.

Method 400 may also include, at 440, identifying a member of the set of threads as a critical thread. The identification of the critical thread may be based on the thread arrival counts for the members of the set of threads. The thread with the lowest arrival count may be identified as the critical thread.

Method 400 may also include, at 450, manipulating an attribute of the critical thread, of a thread other than the critical thread, of the core upon which the critical thread runs, and/or of a core other than the core upon which the critical thread runs. In one embodiment, the manipulating may include selectively clock-gating a core upon which the critical thread is to run upon determining that the critical thread has experienced a cache miss. In another embodiment, the manipulating may include selectively manipulating a priority for a non-critical thread. In yet another embodiment, the manipulating may include selectively manipulating the operating voltage for a core upon which a non-critical thread is to run.

Thus, establishing meeting points at 410 provides an opportunity to identify a critical thread in a set of related threads executing a parallel application. Establishing the meeting points at 410 also provides an opportunity to identify a core associated with the critical thread. In different embodiments, power savings can then be achieved as the result of manipulations made at 450. The manipulation may involve different techniques associated with meeting points and identifying critical threads and/or cores. Core frequency and/or voltage may be manipulated, priority may be manipulated, and/or a processor may be powered down or clock-gated when a critical thread becomes inactive.

"Data store", as used herein, refers to a physical and/or logical entity that can store data. A data store may be, for example, a table, a list, a queue, a heap, a memory, a register, and so on. In different examples a data store may reside in one logical and/or physical entity and/or may be distributed between multiple logical and/or physical entities.

"Logic", as used herein, includes but is not limited to hardware, firmware, software and/or combinations thereof to perform a function(s) or an action(s), and/or to cause a function or action from another logic, method, and/or system. Logic may include discrete logic (e.g., application specific integrated circuit (ASIC)), an analog circuit, a digital circuit, a programmed logic device, a memory device containing instructions, and so on, Logic may include a gate(s), a combinations of gates, other circuit components, and so on.

"Signal", as used herein, includes but is not limited to, electrical signals, optical signals, analog signals, digital signals, or other means that can be received, transmitted and/or detected.

To the extent that the term "includes" or "including" is employed in the detailed description or the claims, it is intended to be inclusive in a manner similar to the term "comprising" as that term is interpreted when employed as a transitional word in a claim. Furthermore, to the extent that the term "or" is employed in the detailed description or claims (e.g., A or B) it is intended to mean "A or B or both". The term "and/or" is used in the same manner, meaning "A or B or both". When the applicants intend to indicate "only A or B but not both" then the term "only A or B but not both" will be employed. Thus, use of the term "or" herein is the inclusive, and not the exclusive use. See, Bryan A. Garner, A Dictionary of Modern. Legal Usage 624 (2d. Ed. 1995).

To the extent that the phrase "one or more of, A, B, and C" is employed herein, (e.g., a data store to store one or more of, A, B, and C) it is intended to convey the set of possibilities A, B, C, AB, AC, BC, and/or ABC (e.g., the data store may store only A, only B, only C, A&B, A&C, B&C, and/or A&B&C). It is not intended to require one of A, one of B, and one of C. When the applicants intend to indicate "at least one of A, at least one of B, and at least one of C", then the phrasing "at least one of A, at least one of B, and at least one of C" will be employed.

What is claimed is:

1. An apparatus, comprising:
   a first unit to selectively update a meeting point count for a thread upon detecting the arrival of the thread at a meeting point, the thread being a member of a set of threads to execute a parallel workload in a multi-threading core, the meeting point being an address of an instruction that a member of the set of threads is to execute;
   a second unit to identify periodically a critical thread in the set of threads based on the thread meeting point counts; and
   a third unit to selectively manipulate a configurable attribute of one of, the critical thread, and a core containing a critical thread upon which the critical thread is to run.

2. The apparatus of claim 1, including a fourth unit to establish the meeting point, the fourth unit being one of, a compiler, and a run-time analyzer implemented in hardware in a core.

3. The apparatus of claim 1, where detecting the arrival of a thread at a meeting point includes comparing an instruction pointer value to a meeting point address.

4. The apparatus of claim 1, where a period of time associated with periodically identifying a critical thread is one or more of, user configurable based on a user input, and automatically configurable based on an automatic analysis of a thread mix.

5. The apparatus of claim 1, where the critical thread is the member of the set of threads that will complete last.

6. The apparatus of claim 5, comprising a fifth unit to determine an imbalance factor relating the critical thread to another member of the set of threads, the imbalance factor corresponding to a difference in predicted completion times between the critical thread and a non-critical thread in the set of threads, where the predicted completion time depends, at least in part, on a meeting point count and a total number of loop iterations during a period of time associated with periodically identifying a critical thread.

7. The apparatus of claim 6, the configurable attribute being a priority of the critical thread, the third unit to cause one or more of, increasing the priority of the critical thread relative to the priority of the non-critical thread, and decreasing the priority of the non-critical thread relative to the critical thread, based on processing a fastest thread identifier and an iteration difference counter, where causing the priority of the non-critical thread to be decreased includes sending a prioritization message and where causing the priority of the critical thread to be increased includes sending a prioritization message.

8. The apparatus of claim 7, the priority being the issue priority and where the degree to which the issue priority is manipulated depends, at least in part, on the magnitude of the imbalance factor.

9. The apparatus of claim 6, the third unit to selectively clock-gate the core containing the critical thread upon determining that the critical thread has experienced a cache miss.

10. The apparatus of claim 5, where the first unit provides a signal identifying the thread that arrived at the meeting point and the meeting point at which the thread arrived.

11. The apparatus of claim 10, comprising a fifth unit to determine an imbalance factor relating the core containing a critical thread to a second core associated with a non-critical member of the set of threads, the imbalance factor corresponding to the difference in predicted completion times between the core containing the critical thread and the second core, where the predicted completion time depends, at least in part, on a meeting point count and a total number of loop iterations during a period of time associated with periodically identifying a critical thread.

12. The apparatus of claim 11, the configurable attribute being an operating frequency of the second core, the third unit to cause a decrease in the operating frequency of the second core.

13. The apparatus of claim 12, where the degree to which the operating frequency of the second core is decreased depends, at least in part, on the magnitude of the imbalance factor.

14. A method, comprising:
establishing one or more meeting points for members of a set of threads identified to perform a task in parallel on one or more multithreading cores;
detecting that a member of the set of threads has reached a meeting point;
updating for the thread a thread arrival count that records how many times the thread has reached the meeting point; and
identifying one member of the set of threads as a critical thread based on the thread arrival counts for the members of the set of threads.

15. The method of claim 14, comprising one or more of:
selectively clock-gating a core upon which the critical thread is to run upon determining that the critical thread has experienced a cache miss;
selectively manipulating a priority for a non-critical thread based on a relationship between a predicted completion time for the critical thread and a predicated completion time the non-critical thread; and
selectively manipulating the operating voltage for a core upon which a non-critical thread is to run based on a relationship between a predicted completion time for a core upon which the critical thread is to run and a predicated completion time for core upon which the non-critical thread is to run.

* * * * *